(12) United States Patent
Lan

(10) Patent No.: US 10,281,127 B1
(45) Date of Patent: May 7, 2019

(54) LED LAMP

(71) Applicant: Shenzhen Guanke Technologies Co., Ltd., Shenzhen (CN)

(72) Inventor: Qing Lan, Shenzhen (CN)

(73) Assignee: SHENZHEN GUANKE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/811,731

(22) Filed: Nov. 14, 2017

(30) Foreign Application Priority Data

Oct. 17, 2017 (CN) .......................... 2017 1 0977425

(51) Int. Cl.
| F21V 23/06 | (2006.01) |
| F21V 29/70 | (2015.01) |
| F21V 23/00 | (2015.01) |
| F21S 4/10 | (2016.01) |
| F21Y 115/10 | (2016.01) |

(52) U.S. Cl.
CPC ............... F21V 23/06 (2013.01); F21S 4/10 (2016.01); F21V 23/001 (2013.01); F21V 23/003 (2013.01); F21V 29/70 (2015.01); *F21Y 2115/10* (2016.08)

(58) Field of Classification Search
CPC ...... F21K 9/00; F21K 9/20; F21S 4/10; F21V 15/01; F21V 21/002; F21V 21/005; F21V 23/001; F21V 23/002; F21V 23/06; F21V 27/02; F21V 29/004; F21V 29/70; F21Y 2115/10; H01R 13/582; H01R 13/5825; H01R 13/5841; H01R 13/7175
See application file for complete search history.

(56) References Cited

U.S. PATENT DOCUMENTS

| 5,156,454 A * | 10/1992 | White ............... F21S 8/022 362/153 |
| 6,350,046 B1 * | 2/2002 | Lau ................... F21S 8/026 362/147 |
| 7,252,405 B2 * | 8/2007 | Trenchard ............ B63B 45/04 362/235 |
| 7,731,396 B2 * | 6/2010 | Fay ................... F21V 21/002 362/249.02 |
| 7,922,364 B2 * | 4/2011 | Tessnow .............. F21K 9/00 362/294 |
| 8,714,785 B2 * | 5/2014 | Osada ................. F21S 8/02 362/373 |
| 2010/0118532 A1 * | 5/2010 | Liang ................. F21S 2/005 362/235 |

* cited by examiner

Primary Examiner — Hargobind S Sawhney

(57) ABSTRACT

An LED lamp comprises a first inserting portion; a first cable electrically coupled to the first inserting portion to light the LED lamp; a second inserting portion; and a second cable inserted into the second inserting portion to connect two LED lamps.

14 Claims, 7 Drawing Sheets

LED LAMP

CROSS REFERENCE TO RELATED APPLICATIONS

This application claims priority to Chinese Patent Application No. 201710977425.1, filed on Oct. 17, 2017, which is hereby incorporated by reference herein as if set forth in its entirety.

BACKGROUND

1. Technical Field

The present disclosure generally relates to illuminating field, and particularly to an LED lamp.

2. Description of Related Art

A handed lamp has a low luminous efficiency, a high energy consumption. The handed lamp only includes one lamp body, it is difficult to form a light string with a plurality of handed lamps.

Therefore, a need exists in the industry to overcome the described problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
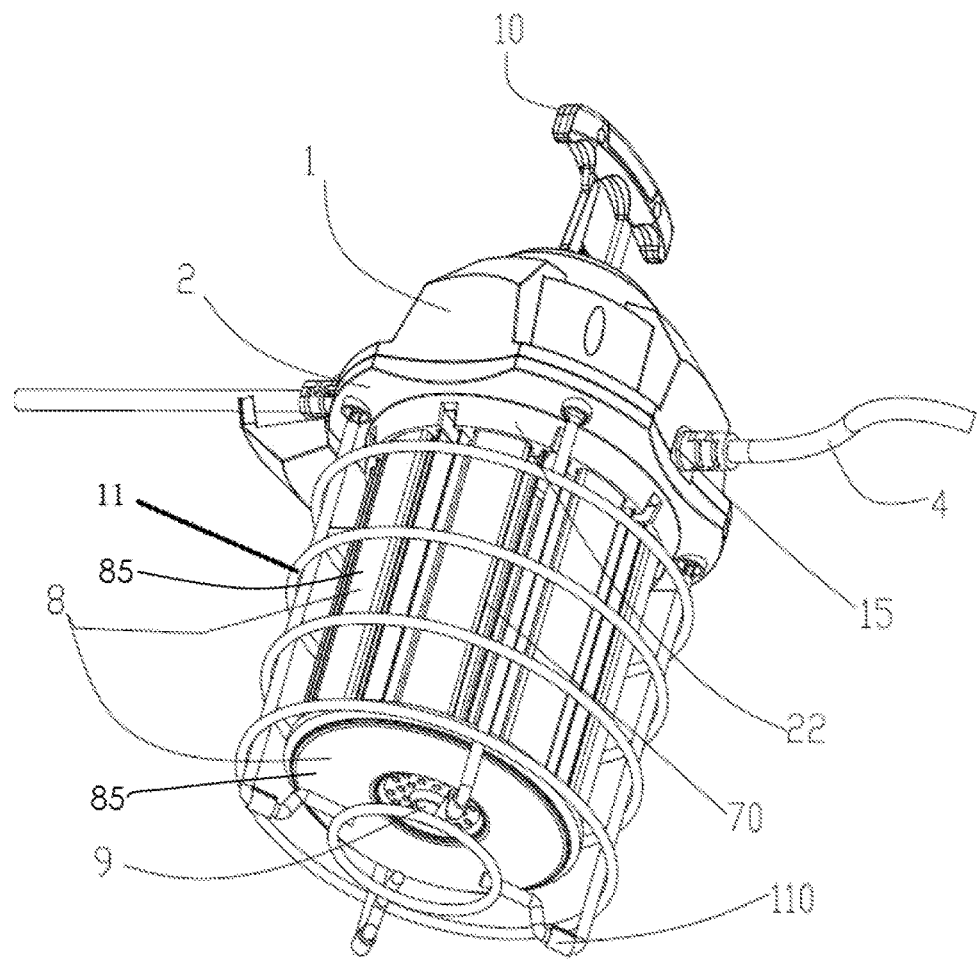
FIG. 1 is an exploded view of an LED lamp according to one embodiment.
Figure 2:
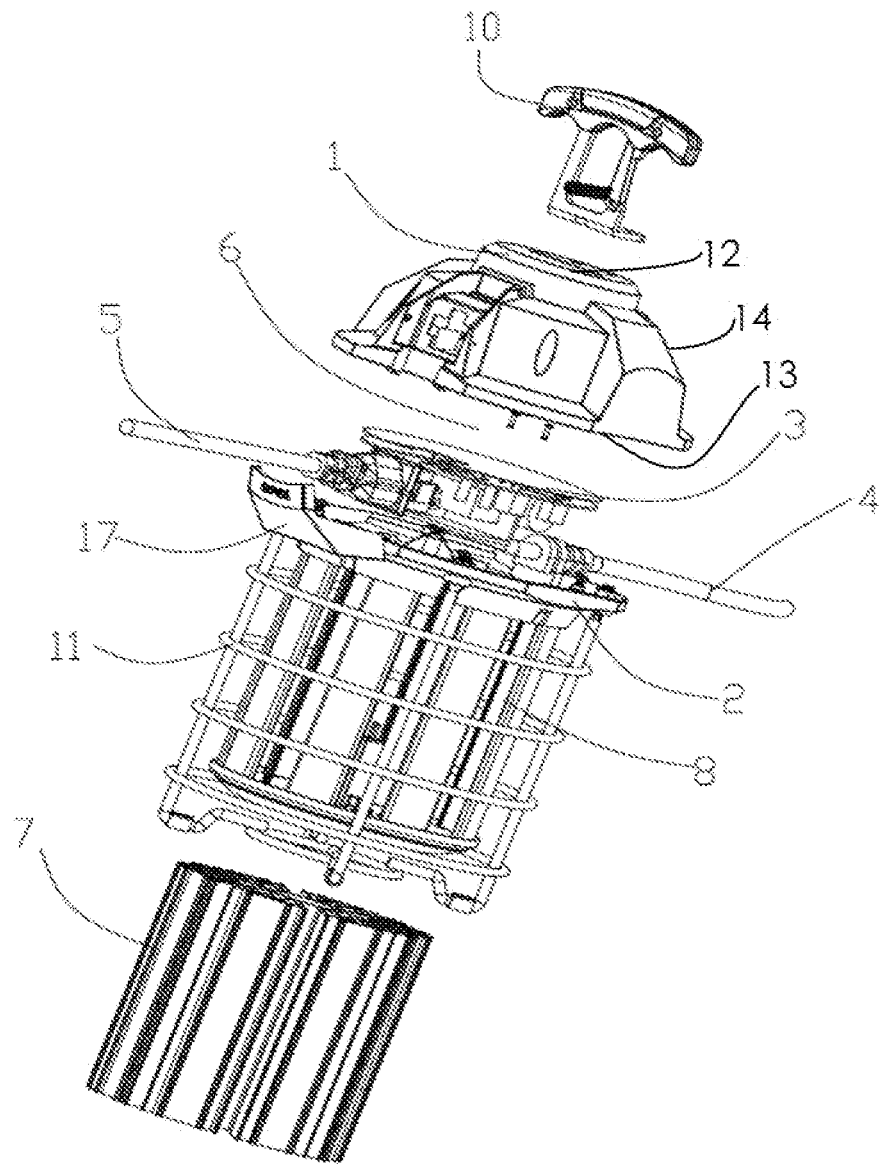
FIGS. 2 and 3 are schematic views of an LED lamp according to one embodiment.
Figure 3:
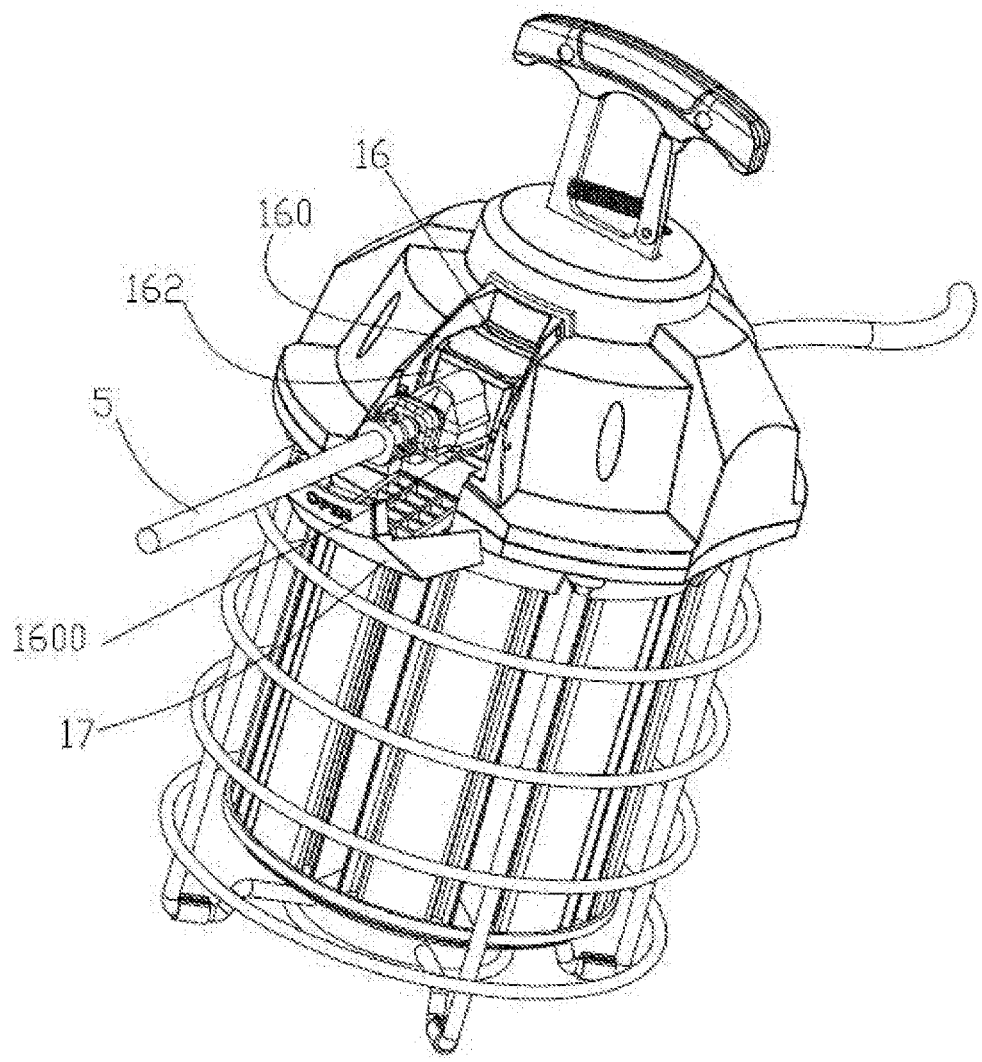
Figure 4:
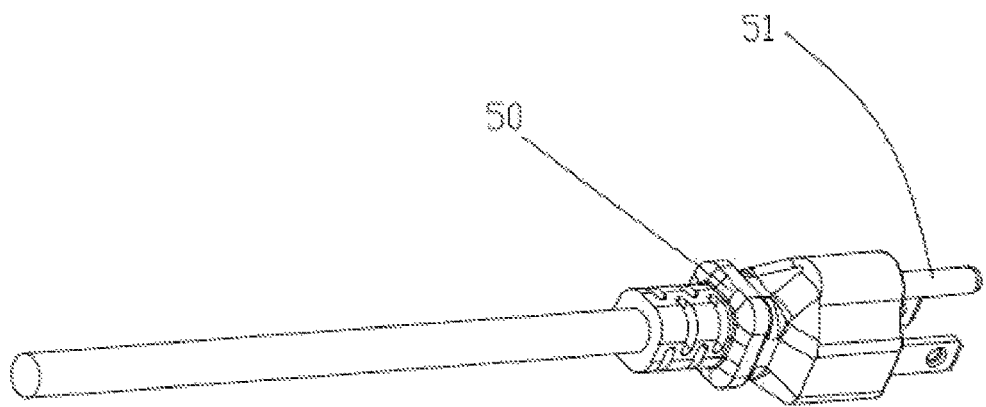
FIG. 4 is a schematic view of a second cable of an LED lamp according to one embodiment.
Figure 5:
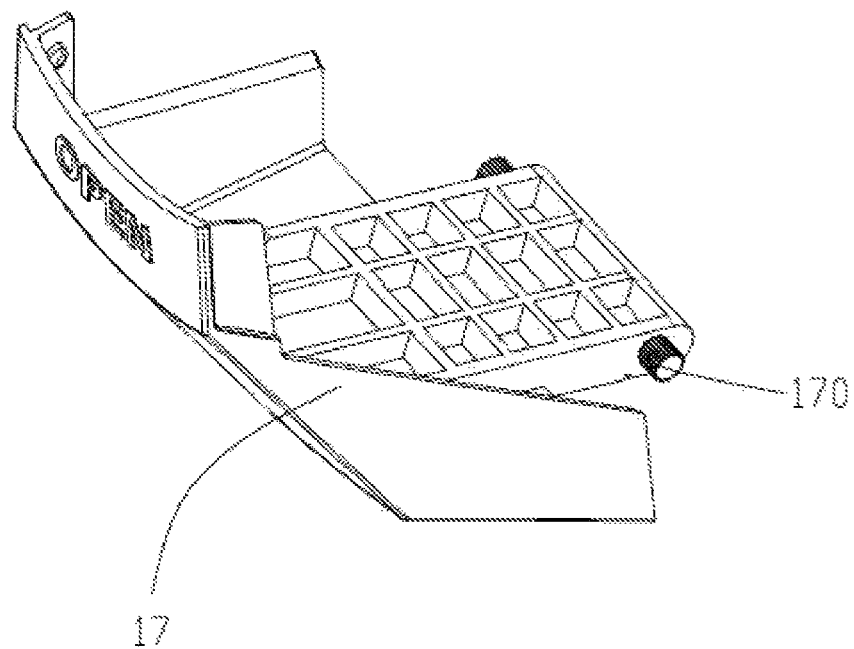
FIG. 5 is a schematic view of a protecting cap of an LED lamp according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

FIG. 1 shows an LED lamp. The LED lamp can include a lamp shell 1, a fixing device 2, a driving device 3, a first cable 4, and a second cable 5. The lamp shell 1 includes a top 12, a bottom 13 opposite to the top 12, and a side 14 connected between the top 12 and the bottom 13.

Referring to FIGS. 1-5, the lamp shell 1 can include a first inserting portion 15, a second inserting portion 16, and a protecting cap 17. The first inserting portion 15 and the second inserting portion 16 are located at the side 14 of the lamp shell 1 and opposite to each other. The protecting cap 17 is manually operated to rotate, thus the protecting cap 17 can be opened or closed. The second inserting portion 16 is protected by the protecting cap 17. The fixing device 2 is fixedly connected with the bottom 13 of the lamp shell 1. The protecting cap 17 is movably connected to the fixing device 2 and operated rotatably to open and close the second inserting portion 16. The first inserting portion 15 is vertically inserted into the fixing device 2 and fixedly connected to the fixing device 2. The driving device 3 is received in an accommodating cavity 6 collectively formed by the lamp shell 1 and the fixing device 2. The driving device 3 is electrically coupled to the first inserting portion 15 and the second inserting portion 16. The first cable 4 is electrically coupled with the first inserting portion 15 to light the LED lamp. When the second cable 5 is inserted into the second inserting portion 16, the second cable 5 is configured to connect the LED lamp and another LED lamp.

In the embodiment, the protecting cap 17 and the lamp shell 1 are fixed by a locker. The protecting cap 17 is manually pulled to rotate downward, the locker is opened and then the protecting cap 17 is opened. The protecting cap is manually pulled to rotate upward, the locker is closed, and then the protecting cap 17 is closed. The locker is latched again to fix the protecting cap 17 and the lamp 1.

In the embodiment, the fixing device 2 and the lamp shell 1 is fixed by a screw. The driving device 3 is configured to turn on and off the LED lamp. The driving device 3 is electrically coupled with the first inserting portion 15 and the second inserting portion 16 via a wiring. The driving device 3 can include a plurality of electric elements and an L-shaped plate. The plurality of electric elements can be protected by the L-shaped plate.

In the embodiment, the LED lamp is single. The first cable 4 is electrically coupled with the first inserting portion 15. And an electrical connection between the first cable 3 and the first inserting portion 15 is not pluggable. The first cable 4 is coupled with an external power source and the LED lamp is supplied power by the external power source. The protecting cap 17 is closed to prevent dust and moisture entering into the second inserting portion 16 to etch the elements in the second inserting portion 16. When the LED lamp is a lamp string, the second inserting portion 16 is opened, the second cable 5 is inserted into the second inserting portion 16 with a pluggable connection. The second cable 5 is configured to connect two LED lamps.

The second inserting portion 16 can include a pair of sidewalls 160 which are perpendicular to the fixing device 2. When the protecting cap 17 is closed, the protecting cap 17 resists and wraps the sidewalls 160.

The second inserting portion 16 can further include a bottom surface 163, a first groove 162 is collectively formed by the bottom surface 163 and the pair of sidewalls 160. A plughole 161 is defined on the bottom surface 163 and communicates with the first groove 162. When the protecting cap 17 is closed, the protecting cap 17 covers the first groove 162.

In the embodiment, a trapezoid is formed between the pair of sidewalls 160. When the protecting cap 17 is closed, the protecting cap 17 resists and wraps the sidewalls 160 to seal the second inserting portion 16, thus the second inserting portion 16 can be avoided to expose. A plurality of protrusions are arranged on the lamp shell 1, when the protecting cap 17 is closed, the protecting cap 17 resists the sidewalls 160, so that the protecting cap 17 is visually coincident with the plurality of protrusions to increase n overall aesthetics of the LED lamp.

In the embodiment, a first groove 162 is formed by the sidewalls 160 and the lamp shell 1. The plughole 161 is arranged in the first groove 162 to protect the plughole 161. The LED lamp can include three plugholes 161 to form a three pin plug. An electrical contact is arranged in the plughole 161. The plughole 161 is received in a surface of the first groove 162, thus the second cable 5 can be easily inserted into the plughole 161.

The second cable 5 can include an inserting end 51 and a fixing end 50. The inserting end 51 is fixedly connected with the fixing end 50. The inserting end 51 is inserted into the plughole 161 to connect the second cable 5 and the second inserting portion 16.

A fastener 1600 is arranged between the pair of sidewalls 160. The fastener 1600 is movably connected with the sidewalls 160. When the inserting end 51 is inserted into the plughole 161, the fastener 1600 fastens with the fixing end 50. When the protecting cap 17 is closed, the fastener 1600 rotates upward to be received in the first groove 162.

In the embodiment, as the fastener 1600 is movably connected with the sidewall 160 and when the protecting cap 17 is closed, the fastener 1600 rotates upward to be received in the first groove 162, the protecting cap 17 is not affected to close. When the inserting end is inserted into the plughole 161, the fastener 1600 is manually operated to rotate downward to engage with the fixing end. And the fastener 1600 is perpendicular to the first groove 162.

In the embodiment, the fastener 1600 is arranged to engage with the fixing end to avoid the second cable 5 detaching from the second inserting portion 16 when LED lamp is used as a light string with the second cable 5 inserted into the second inserting portion 16. Thus, the second cable 5 can stably connect with the second inserting portion 16.

Figure 6:
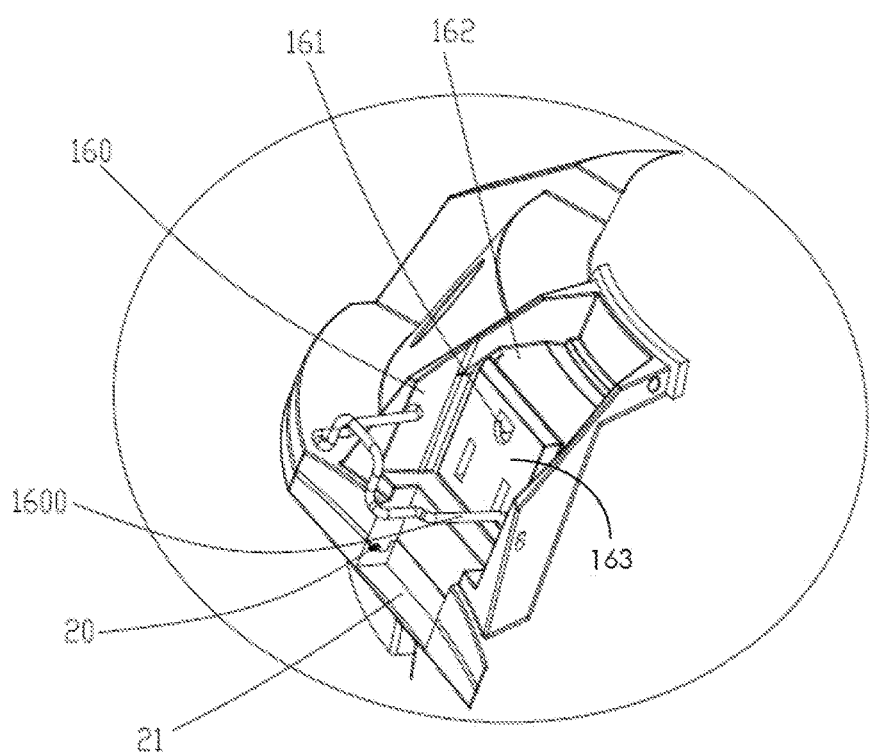
FIGS. 6-7 an enlarged view of an LED lamp according to one embodiment.
Figure 7:
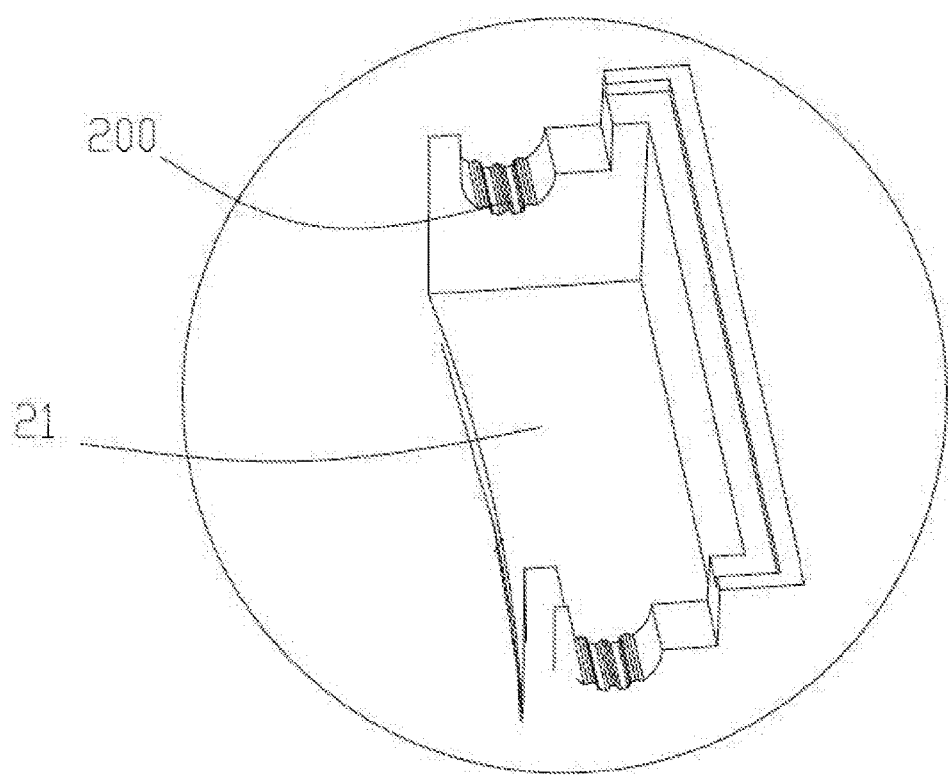

Referring to FIGS. 6 and 7, a pair of gears 170 are arranged in the protecting cap 17. The pair of gears 170 are symmetrically set relative to the protecting cap 17. when the fixing device 2 latches with the lamp shell 1, a pair of positioning holes 20 are formed by the fixing device 2 and the lamp shell 1. The pair of gears 170 engages with the pair of positioning holes 20, respectively, to rotate the protecting cap 17.

In the embodiment, the positioning hole 20 is formed by the fixing device 2 and the lamp shell 1 are latched to form the positioning hole 20, that is, the fixing device 2 and the lamp shell 1 can include one half of positioning hole 20. The pairs of gears 170 are fixed in the positioning hole 20 when the fixing device 2 latches with the lamp shell 1. It is not needed to open a hole to receive the pair of gears 170 and the positioning hole 20 and the pair of gears 170 can be assembled easily and fast.

In the embodiment, the pair of gears 170 rotates in the positioning hole 20 to drive the protecting cap 17, thus the protecting cap 17 can be opened or closed.

A plurality of gear racks 200 are arranged in each of the positioning holes 20. Each of the pair of gears 170 engages with the gear racks 200 in the corresponding positioning holes 20 eerpomte to drive the protecting cap 17 to rotate relatively to the lamp shell 1, thus the protecting cap 17 can opens the first groove 162 or closes the first groove 162.

In the embodiment, a plurality of gear racks 200 is arranged in the pair of gears 170 and the positioning hole 20. The plurality of gear racks 200 is equidistantly arranged in the pair of gears 170 and the positioning hole 20. The pair of gears 170 and the plurality of gear racks 200 are plastic materials with a certain elasticity, thus the pair of gears 170 can rotate in the positioning hole 20. When the protecting cap 17 stops rotating, the pair of gears 170 can be latched with the positioning hole 20.

The fixing device 2 can further include a second groove 21 communicating with the pair of positioning holes 20. The pair of gears 170 are perpendicular to the second groove 21. The protecting cap 17 is received in the second groove 21 to rotate, that is, the second groove 21 is configured to provide a rotation space for the protecting cap 17.

The LED lamp can further include a radiator 7, a lamp body 8, a sensing probe 9, a handed device 10, and a protecting cover 11.

The radiator 7 can include a plurality of heat sinks 70. The fixing device 2 can include a plurality of clamping sleeves 22 to clamp the plurality of heat sinks 70. The lamp body 8 include a plurality of lamps 85, the plurality of lamps 85 are fixedly arranged in a side and a bottom of the radiator 7. The lamp body 8 is electrically coupled with the driving device 3. The sensing probe 9 is located at the bottom of the heat sinks 70, and is electrically coupled with driving device 3 to light the LED lamp. The handed device 10 is fixedly connected with the top 12 of the lamp shell 1. The protecting cover 11 is fixed in the lamp shell 1. The radiator 7 and the lamp body 8 are arranged in the protecting cover 11.

In the embodiment, the radiator 7 is configured for heat dissipation of the lamp body 7. The radiator 7 can include a plurality of heat sinks 70 with gaps therebetween to improve heat dissipation efficiency.

In the embodiment, the fixing device 2 can include a plurality of clamping sleeves 22. Each of the plurality of clamping sleeves 22 clamps and fixes one heat sink 70 so that the fixing device 2 can be more quickly assembled with the radiator 7.

The lamp body 8 can include a lighting plate and a lamp cover. The lamp body 8 is fixedly arranged in the side and the bottom of the radiator 7. A circumference and a bottom of the LED lamp can illuminate, and an illuminating area of the LED lamp is increased to reach 360 degrees. The driving device 3 is electrically coupled with the lamp body 8 to control the lamp body 8.

In the embodiment, the sensing probe 9 can be an infrared sensing probe arranged in the lamp body 8. The sensing probe 9 is electrically coupled with the driving device 3. An infrared remote controller can control the driving device 3 via the sensing probe 9, thus the LED lamp can be turned on and off easily and conveniently.

In the embodiment, the LED lamp can function as a handed lamp with the handed device 10. In another embodiment, the handed device can be mounted in an external device, such as the LED lamp is hanged in an external device via the handed device.

In the embodiment, the protecting cover 11 can be a wire with space. The protecting cover 11 can protect the radiator 7 and the lamp body 8, thus the LED lamp can not be scratched. A protecting layer 110 is arranged in a bottom of the protecting cover 11.

In the embodiment, the protecting layer 110 is arranged in the bottom of the protecting cover 11, when the LED lamp is horizontally placed, the protecting cover can not be scratched with the protecting layer 110, thus the LED lamp can keep an overall beauty.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. AN LED lamp, comprising:
a lamp shell having a first inserting portion, a second inserting portion, and a protecting cap; wherein the lamp shell comprises a top, a bottom opposite to the top, and a side connected between the top and the bottom, the first inserting portion and the second inserting portion are located at the side of the lamp shell and opposite to each other;
a fixing device fixedly connected with the bottom of the lamp shell, wherein the protecting cap is movably connected to the fixing device and operated rotatably to open and close the second inserting portion, and the first inserting portion is fixedly connected to the fixing device;
a driving device received in an accommodating cavity collectively formed by the lamp shell and the fixing device, wherein the driving device is electrically coupled to the first inserting portion and the second inserting portion;
a first cable electrically coupled with the first inserting portion to light the LED lamp; and
a second cable inserted into the second inserting portion to connect the LED lamp and another LED lamp.

2. The LED lamp of claim 1, wherein the second inserting portion comprises a pair of sidewalls which are perpendicular to the fixing device, when the protecting cap is closed, the protecting cap resists and wraps the sidewalls.

3. The LED lamp of claim 2, wherein the second inserting portion comprises a bottom surface, a first groove is collectively formed by the bottom surface and the pair of sidewalls, a plughole is defined on the bottom surface and communicates with the first groove; when the protecting cap is closed, the protecting cap covers the first groove.

4. The LED lamp of claim 3, wherein the second cable comprises an inserting end and a fixing end fixedly connected with the inserting end; and wherein the inserting end is inserted into the plughole to connect the second cable and the second inserting portion.

5. The LED lamp of claim 4 further comprising a fastener, wherein the fastener is arranged between the pair of sidewalls, the fastener is movably connected with the sidewalls; wherein when the inserting end is inserted into the plughole, the fastener fastens with the fixing end and when the protecting cap is closed, the fastener rotates upward to be received in the first groove.

6. The LED lamp of claim 1 further comprising a pair of gears, wherein the pair of gears are fixedly arranged in the protecting cap, and symmetrically set relative to the protecting cap; when the fixing device latches with the lamp shell, a pair of positioning holes are formed by the fixing device and the lamp shell; the pair of gears engages with the pair of positioning holes, respectively, to rotate the protecting cap.

7. The LED lamp of claim 6, wherein a plurality of gear racks are arranged in each of the positioning holes, each of the pair of gears engages with the gear racks in the corresponding positioning holes to drive the protecting cap to rotate relatively to the lamp shell, such that, the protecting cap opens the first groove or closes the first groove.

8. The LED lamp of claim 6, wherein the fixing device defines a second groove communicating with the pair of the positioning holes and the first groove; the second groove provides a rotation space for the protecting cap.

9. The LED lamp of claim 1, further comprising:
a radiator comprising a plurality of heat sinks, wherein the fixing device comprises a plurality of clamping sleeves clamping the plurality of heat sinks.

10. The LED lamp of claim 9, further comprising a lamp body comprising a plurality of lamps, the plurality of lamps are located at a side and a bottom of the heat sinks and electrically coupled to the driving device.

11. The LED lamp of claim 10, further comprising a protecting cover fixedly arranged in the lamp shell, wherein the radiator and the lamp body are arranged in the protecting cover.

12. The LED lamp of claim 11, further comprising a protecting layer is located at a bottom of the protecting cover.

13. The LED lamp of claim 9, further comprising a sensing probe is located at the bottom of the heat sinks, and electrically coupled to the driving device to light the LED lamp.

14. The LED lamp of claim 1, further comprising a handed device fixedly connected with the top of the lamp shell.

* * * * *